(12) United States Patent
Sorin et al.

(10) Patent No.: US 6,208,774 B1
(45) Date of Patent: Mar. 27, 2001

(54) POLARIZATION INDEPENDENT LIGHT SWITCHING DEVICE BASED ON LIQUID CRYSTALS

(75) Inventors: Wayne V. Sorin, Mountain View; Douglas M. Baney, Los Altos, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/334,483

(22) Filed: Jun. 16, 1999

(51) Int. Cl.[7] ........................................................ G02B 6/00
(52) U.S. Cl. ................................ 385/11; 385/12; 385/14; 385/16; 349/196
(58) Field of Search ............................... 385/1–8, 11–14, 385/16; 349/196

Primary Examiner—Robert Kim

(57) ABSTRACT

A light guiding element for routing a light signal between an input port and an output port or for blocking the propagation of the light signal between the input and output ports depending on the state of the switching element. The guiding element utilizes a beam splitter for separating the input light signal into physically separated first and second polarized light signals, the first light signal having a polarization that is orthogonal to that of the second light signal. A first polarization rotator rotates the polarization of the first light signal such that the polarization of the first light signal is parallel to that of the second light signal. A first waveguide having first and second states operates on the first light signal such that the first waveguide guides the first light signal along a predetermined path in the first state while not guiding the first light signal in the second state. A second waveguide having first and second states operates on the second light signal such that the second waveguide guides the second light signal along a predetermined path in the first state while not guiding the second light in the second state. A second polarization rotator rotates the polarization of the second light signal such that the polarization of the second light signal is orthogonal to that of the first light signal. A beam combiner then combines the first and second light signals and couples the same to the output light port.

7 Claims, 4 Drawing Sheets

POLARIZATION INDEPENDENT LIGHT SWITCHING DEVICE BASED ON LIQUID CRYSTALS

FIELD OF THE INVENTION

The present invention relates to light guides, and more particularly, to programmable light guides based on liquid crystals.

BACKGROUND OF THE INVENTION

Data communication systems based on fiber optics provide substantially higher bandwidth than systems based on electrical systems. Unfortunately, switching devices for switching optical signals between an input fiber and a plurality of output fibers have not kept pace. As a result, optical signals are typically converted back to electrical signals prior to switching. The electrical signals are then switched using conventional packet switching techniques and reconverted to optical signals prior to entering the output fibers. The limitations of electrical switching systems prevent the realization of the full data bandwidth of the fibers. Accordingly, a significant amount of research has gone into developing optical switches that avoid the conversion of the light signals back to electrical signals.

One promising method for switching optical signals between optical paths relies on a waveguide whose location is electrically controlled. A waveguide may be generated by altering the index of refraction of a medium along the path over which the light is to travel such that the desired path has a higher index of refraction than the surrounding medium. Devices based on liquid crystals are particularly attractive because of the large changes in index of refraction that can be induced in a liquid crystal layer by applying a low frequency AC electrical field across the layer. A simple switching device can be constructed by energizing one set of electrodes on the surface of the liquid crystal layer while leaving an alternative set in a non-energized state. The region between the energized electrodes then becomes the waveguide that specifies the direction in which the light signal will propagate in the liquid crystal layer.

Unfortunately, liquid crystal based light guides only guide light of one linear polarization. Light of the orthogonal polarization experiences a different index of refraction and is not guided. Since optical signals in such systems typically have randomly changing polarization states, unpredictable transmission can occur.

Broadly, it is the object of the present invention to provide an improved optical switching element.

It is a further object of the present invention to provide an optical switching element that operates on a light signal independent of the polarization state of that light signal without introducing the light losses inherent in polarization dependent waveguides.

These and other objects of the present invention will become apparent to those skilled in the art from the following detailed description of the invention and the accompanying drawings.

SUMMARY OF THE INVENTION

The present invention is a light guiding element for routing a light signal between an input port and an output port or for blocking the propagation of the light signal between the input and output ports depending on the state of the light guiding element. The light guiding element utilizes a polarizing beam splitter for separating the input light signal into physically separated first and second polarized light signals, the first light signal having a polarization that is orthogonal to that of the second light signal. A first polarization rotator rotates the polarization of the first light signal such that the polarization of the first light signal is parallel to that of the second light signal. A first waveguide having first and second states operates on the first light signal such that the first waveguide guides the first light signal along a predetermined path in the first state while not guiding the first light signal in the second state. A second waveguide having first and second states operates on the second light signal such that the second waveguide guides the second light signal along a predetermined path in the first state while not guiding the second light in the second state. A second polarization rotator rotates the polarization of the second light signal such that the polarization of the second light signal is orthogonal to that of the first light signal. A polarizing beam combiner then combines the first and second light signals and couples the same to the output light port. The first and second waveguides are preferably constructed from a guide layer of a guide material having a first index of refraction in the absence of an electric field and a second index of refraction in the presence of an electric field. First and second electrodes apply the electric field to a portion of the layer. The electrodes define a guide region in the layer having an index of refraction that is greater than that of the guide layer in regions adjacent to the guide region. The guide material is preferably a liquid crystal medium.

DETAILED DESCRIPTION OF THE INVENTION

Figure 1:
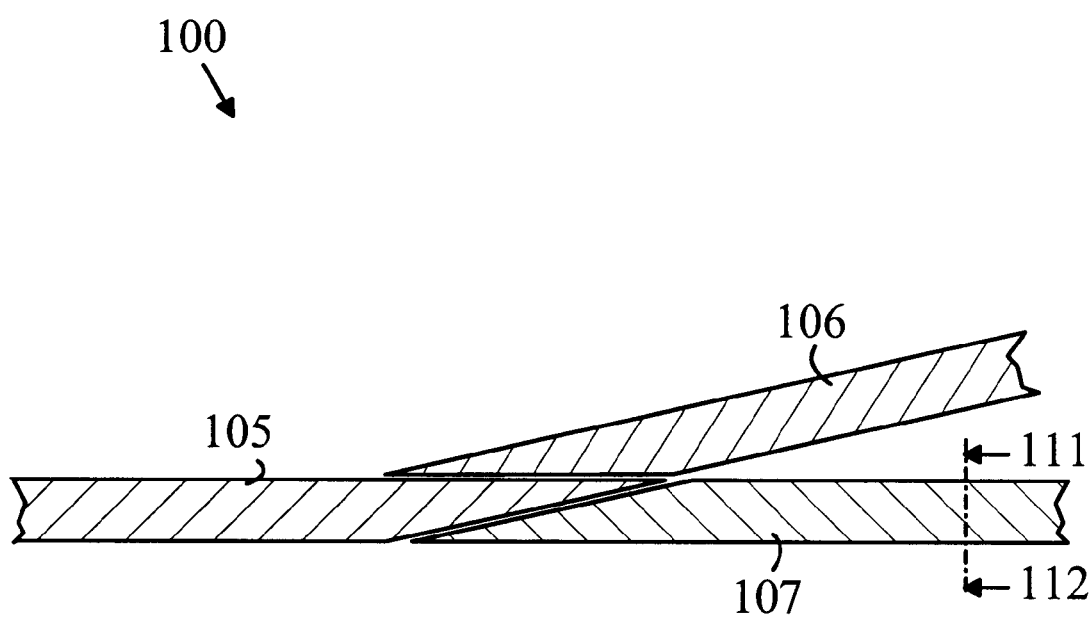
FIG. 1 is a top view of a prior art switching device 100 for switching light signals from an input fiber 101 to either fiber 102 or 103.
Figure 2:
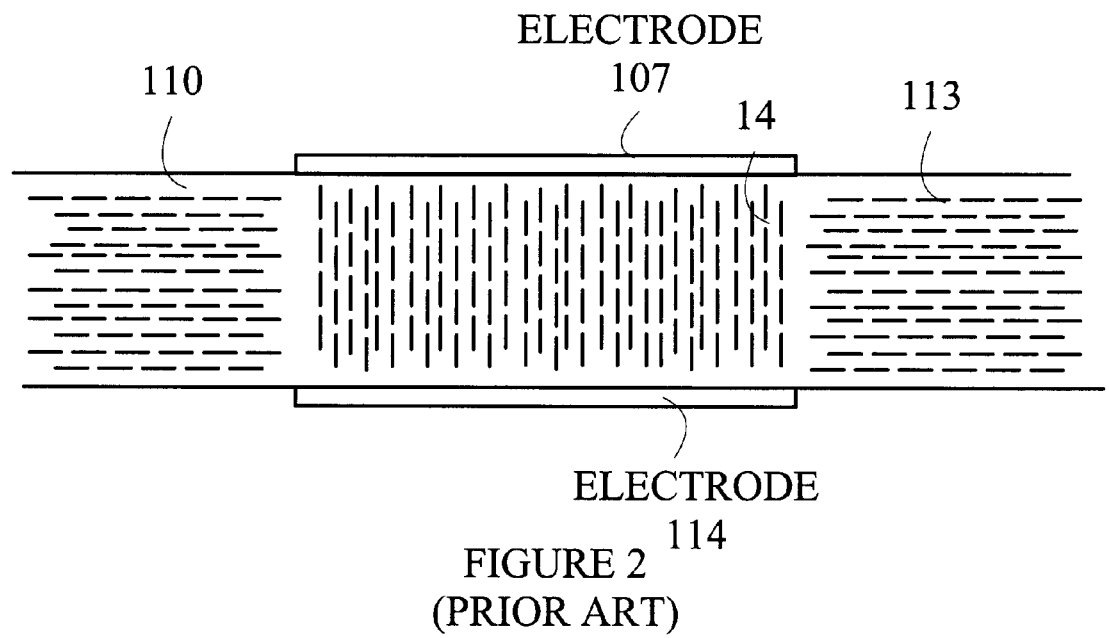
FIG. 2 is a cross sectional view of the switching arrangement shown in FIG. 1 through line 111-112.

The manner in which the present invention provides its advantages may be more easily understood with reference to FIG. 1, which is a top view of a prior art switching device 100 for switching light signals from an input waveguide defined by an electrode 105 to either waveguide of two output waveguides defined by electrodes 106 and 107. The electrodes are placed on one surface of a liquid crystal layer. Corresponding electrodes are placed on the other side of the liquid crystal layer. The placement of the electrodes may be more easily understood with reference to FIG. 2, which is a cross sectional view of the switching arrangement shown in FIG. 1 through line 111-112. The liquid crystal waveguide operates by creating a region under an energized electrode in which the index of refraction is greater than that in the surrounding liquid crystal medium. An AC field is applied across a portion of a liquid crystal layer 110 to change the orientation of the liquid crystal molecules in the applied field as shown at 14. Coupling an appropriate signal generator between electrodes 107 and 114 generates this field. A liquid crystal alignment layer is applied to the walls of the chamber that causes the crystals to be aligned as shown at 113 in the absence of an electric field. When an electric field is applied, the liquid crystals that are not in contact with the crystals on the walls are re-oriented to the direction of the electric field. When the field is removed, the liquid crystals reorient themselves with the crystals in contact with the walls of the chamber. An AC field is utilized to switch the direction of orientation because a DC field would result in ions within the liquid crystals drifting toward one of the electrodes over time.

Light having a linear polarization that is parallel to the alignment direction of the liquid crystals experiences a substantially higher index of refraction than light having its polarization orthogonal to the liquid crystal alignment direction. Hence, only light of one linear polarization is guided by the arrangement shown in FIG. 2.

The generation of the liquid crystal alignment layer is well known in the art, and hence, will not be discussed in detail here. For the purposes of the present invention, it is sufficient to note that the walls of the chamber can be textured such that the molecules of the liquid crystal will assume a specific orientation at the wall. For example, if the molecules are to assume an orientation parallel to the wall surface, the wall surface can be coated with a material that is then textured by rubbing to produce small grooves. The liquid crystal molecules will align themselves in the grooves provided the material is chosen such that the liquid crystals will wet the wall surface. If a non-wetting coating material is utilized, the liquid crystal molecules will align themselves perpendicular to the wall to minimize the interactions with the wall.

Figure 4:
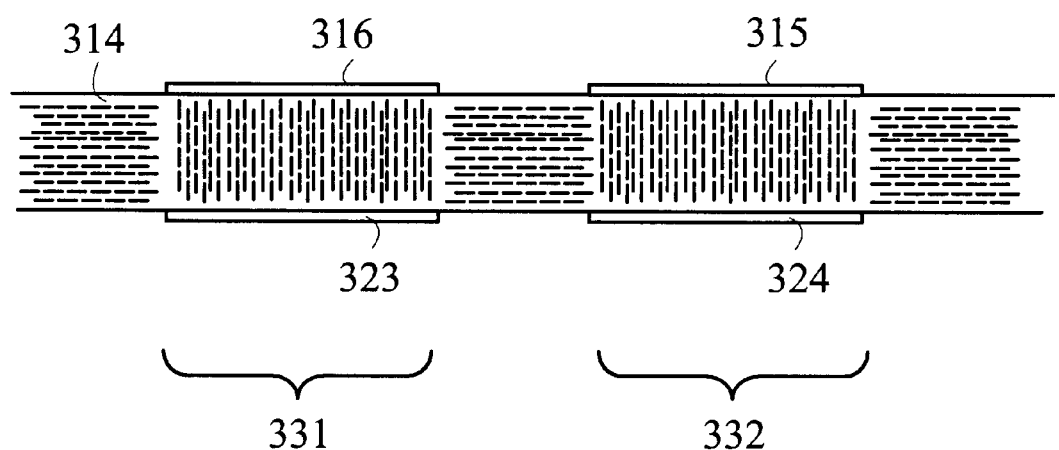
FIG. 4 is a cross-sectional view of the portion of switch 300 through line 321-322.
Figure 3:
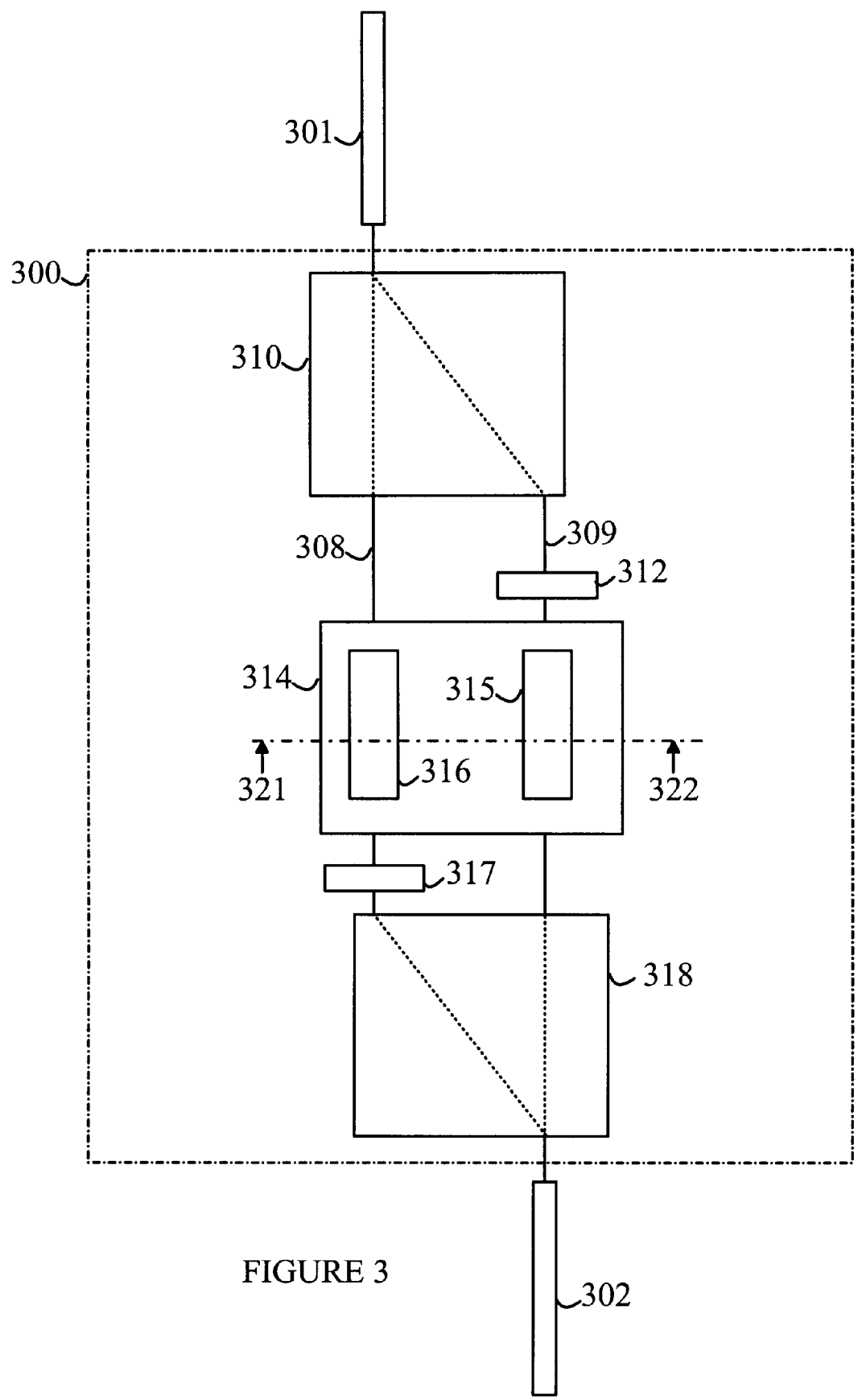
FIG. 3 is a top view of a light switch 300 according to the present invention.

The present invention provides separate switchable waveguides for each polarization. Refer now to FIGS. 3 and 4. FIG. 3 is a top view of a light switch 300 according to the present invention. FIG. 4 is a cross-sectional view of the portion of switch 300 through line 321-322. Light switch 300 transmits light between input fiber 301 and output fiber 302 in one state and blocks the transmission of light between the fibers when the switch is in the other state. The input light signal is first separated into two polarized light beams 308 and 309 having orthogonal polarizations by walk-off crystal 310. For the purposes of this discussion, it is assumed that the polarization of light beam 308 is perpendicular to the drawing sheet. The polarization of light beam 309 is rotated through 90 degrees by beam rotator 312. At this point, the two light beams 308 and 309, both have the same polarization direction.

The two light beams enter a pair of switchable waveguides such as those described above. In this embodiment, the waveguides are constructed from a single liquid crystal layer 314. The top electrodes of the waveguides are shown at 315 and 316. When an AC field is applied across these electrodes and the corresponding bottom electrodes 323 and 324, the light beams are guided in the liquid crystal layer. When no such field is present, the light beams are dispersed and the signals lost.

Upon leaving the switchable waveguide, the light signal on path 308 is rotated through 90 degrees by polarization rotator 317. The two light beams are then recombined in walk-off crystal 318. It should be noted that paths traversed by the two separated polarization beams are preferably the same. This arrangement avoids the introduction of phase differences between the light signals. In the embodiment shown in FIGS. 3 and 4, this is accomplished by rotating each beam through 90° and requiring each beam to traverse paths in which the beam "walks-off" in one walk-off crystal and does not walk-off in the other. Hence, each beam traverses a path that is identical in length and optical materials as that traversed by the other beam.

The above-described embodiment of the present invention utilizes walk-off crystals to separate the incoming light into two polarized beams having orthogonal polarizations. However, it will be obvious to those skilled in the art from the preceding discussion that other optical elements that split a beam into two component beams having orthogonal polarizations may be utilized for this purpose. For example, a polarization dependent beam splitter constructed from a material that reflects one polarization while passing the other may be utilized to separate the light signal into two beams.

The above-described embodiments of the present invention utilize beam rotators that are separate from the liquid crystal layer. Such rotators may be constructed from half wave plates. However, it should be noted that the beam rotators can be implemented by using the liquid crystal boundary layers at the input and output of the waveguides. For example, if the entry window of the beam to be rotated has an orientation layer that is parallel to the direction of polarization of the input light beam, then a region of gradual change in liquid crystal orientation will be created between the entrance window and the remainder of the liquid crystal layer. This region will rotate the incoming polarization vector of the light to match the desired polarization within the waveguide. This same process can be used for rotating the polarization angle of the light beam as it leaves the exit window.

Figure 5:
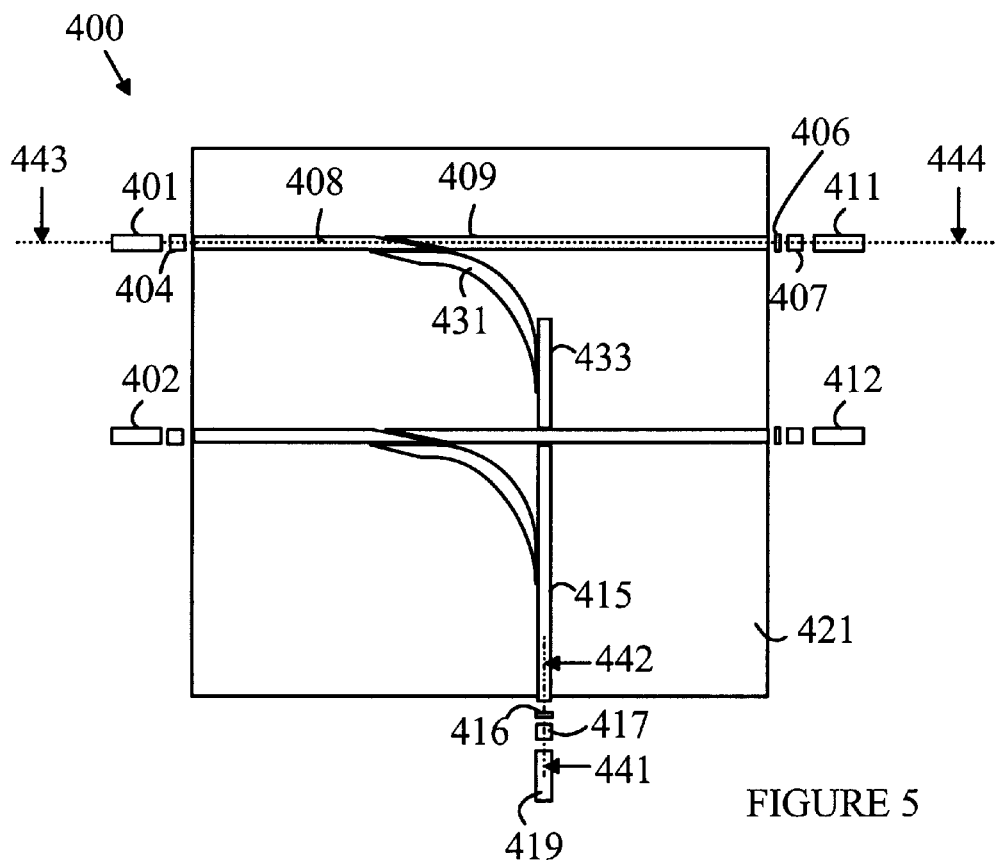
FIG. 5 is a top view of switch 400 according to the present invention.
Figure 6:
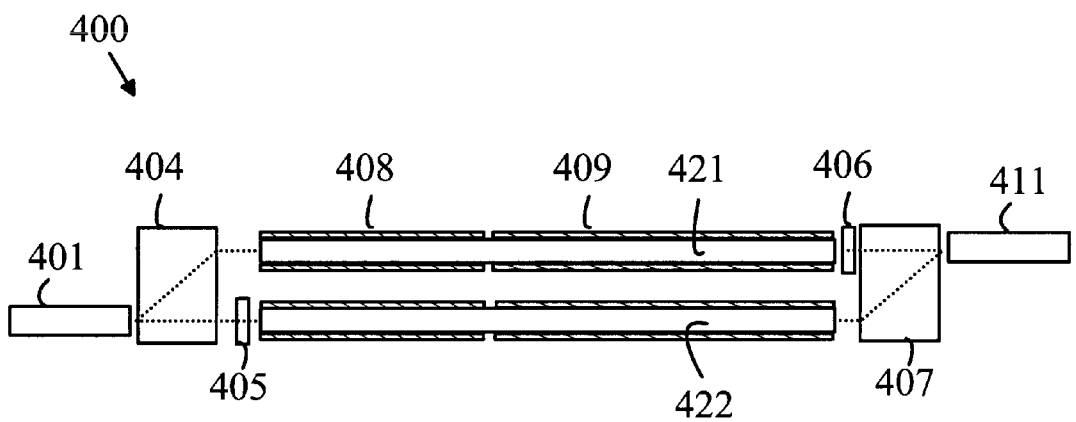
FIG. 6 is a cross-sectional view of switch 400 through lines 443-444 shown in FIG. 5.
Figure 7:
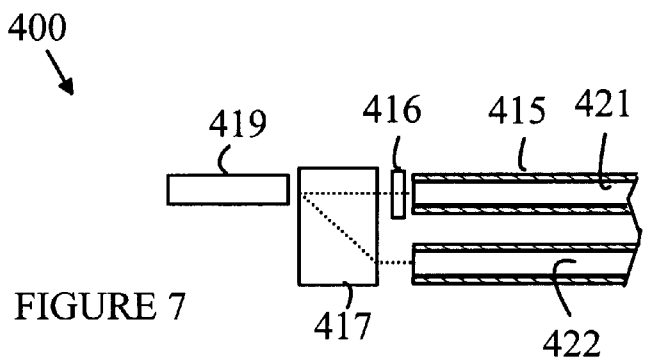
FIG. 7 is a cross-sectional view of switch 400 through line 441-442 shown in FIG. 5.

The embodiment of the present invention described with reference to FIGS. 3 and 4 utilized a single liquid crystal layer to construct both light paths. However, embodiments of the present invention in which the switchable waveguides are constructed in separate liquid crystal layers may also be constructed. Such embodiments are particularly useful in constructing arrays of switches. Refer now to FIGS. 5–7 which illustrate a cross-connect switch 400. FIG. 5 is a top view of switch 400. FIGS. 6 and 7 are cross-sectional views of switch 400 through lines 443-444 and 441-442, respectively. Switch 400 routes light signals from input fibers 401 and 402 to output fibers 411, 412, and 419.

The particular routing depends on the voltages applied to the various electrodes. Switch 400 is constructed on two liquid crystal layers shown at 421 and 422. The manner in which switch 400 operates will be explained in terms of the routing of signals from input fiber 401 to either output fiber 411 or output fiber 419. The routing is accomplished by creating waveguides in each of the liquid crystal layers. The waveguides are created by applying signals to electrodes on the surface of the liquid crystal layers. The electrode pattern on liquid crystal layer 421 is shown in FIG. 5. Liquid crystal layer 422 has an identical pattern. Liquid crystal layer 421 routes the portion of the light signal having one polarization, and liquid crystal layer 422 routes the portion of the light signal having the orthogonal polarization. The input light signal is separated into the two orthogonal components by walk-off crystal 404 which routes one of the components to liquid crystal layer 421 and the other to liquid crystal layer 422. The component routed to liquid crystal layer 422 is rotated through 90° by half wave plate 405 in a manner analogous to that described above.

If the light signal from fiber 401 is to be routed to fiber 411, electrode 409 and the corresponding electrode on layer 422 are energized. In this configuration, electrode 431 and the corresponding electrode on layer 422 remain unenergized. This creates two waveguides, one in each layer, connecting fiber 401 to fiber 411. The signals from the two waveguides are recombined by walk-off crystal 407 after the signal in layer 421 is rotated through 90° by half wave plate 406.

If the light signal from fiber 401 is to be routed to fiber 419, electrode 409 and the corresponding electrode on layer 422 remain unenergized. In this configuration, electrodes 431, 433, 415 and the corresponding electrode on layer 422 are energized. This creates two waveguides, one in each layer, connecting fiber 401 to fiber 419. The signals from the two waveguides are recombined by walk-off crystal 417 after the signal in layer 421 is rotated through 90° by half wave plate 416.

Signals are routed between input fiber 402 and output fibers 412 and 419 in an analogous manner. While switch 400 is only a 2×1 cross-connect, it will be obvious to those skilled in the art from the preceding discussion that the present invention may be utilized to construct a general N×M cross-connect switch.

Various modifications to the present invention will become apparent to those skilled in the art from the foregoing description and accompanying drawings. Accordingly, the present invention is to be limited solely by the scope of the following claims.

What is claimed is:

1. A light guiding element comprising:

an input port for receiving an input light signal;

a beam splitter for separating said input light signal into physically separated first and second polarized light signals, said first light signal having a polarization that is orthogonal to that of said second light signal;

a first polarization rotator for rotating said polarization of said first light signal such that said polarization of said first light signal is parallel to that of said second light signal;

a first waveguide having first and second states, said first waveguide guiding said first light signal along a predetermined path in said first state while not guiding said first light signal in said second state;

a second waveguide having first and second states, said second waveguide guiding said second light signal along a predetermined path in said first state while not guiding said second light in said second state;

a second polarization rotator for rotating said polarization of said first light signal such that said polarization of said first light signal is orthogonal to that of said second light signal; and a beam combiner for combining said first and second light signals.

2. The light guiding element of claim 1 wherein said first waveguide comprises:

a first guide layer of a guide material having a first index of refraction in the absence of an electric field and a second index of refraction in the presence of said electric field; and first and second electrodes for applying said electric field to a first portion of said first guide layer, said electrodes defining a first guide region in said first guide layer having an index of refraction that is greater than that of said first guide layer in regions adjacent to said first guide region.

3. The light guiding element of claim 2 wherein said second waveguide comprises third and fourth electrodes for applying said electric field to a second portion of said first guide layer.

4. The light guiding element of claim 2 wherein said second waveguide comprises:

a second guide layer of a guide material having a first index of refraction in the absence of an electric field and a second index of refraction in the presence of said electric field; and third and fourth electrodes for applying said electric field to a portion of said second guide layer, said electrodes defining a second guide region in said second layer having an index of refraction that is greater than that of said second guide layer in regions adjacent to said second guide region.

5. The light guiding element of claim 2 wherein said guide material comprises liquid crystals.

6. The light guiding element of claim 1 wherein said beam splitter comprises a walk-off crystal.

7. The light guiding element of claim 1 wherein said beam splitter comprises a polarization dependent bean splitter.

* * * * *